United States Patent
Tyson et al.

[15] 3,670,766
[45] June 20, 1972

[54] POPPET AND VALVE ASSEMBLY
[72] Inventors: Henry K. Tyson; Albert Q. Butler, both of Odessa, Tex.
[73] Assignee: Dart Industries Inc., Los Angeles, Calif.
[22] Filed: April 29, 1970
[21] Appl. No.: 32,874

[52] U.S. Cl. ............................. 137/515.5, 137/540, 285/363
[51] Int. Cl. .................................................. F16k 15/00
[58] Field of Search .............. 137/515, 515.3, 515.5, 515.7, 137/540, 469; 285/363, 364, 383, 405

[56] References Cited

UNITED STATES PATENTS

| | | | |
|---|---|---|---|
| 2,959,188 | 11/1960 | Kepner | 137/540 |
| 3,189,046 | 6/1965 | Callahan et al. | 137/540 X |
| 2,525,799 | 10/1950 | Hecker | 137/515.7 |
| 2,602,631 | 7/1952 | Eickmeyer | 137/515.5 |
| 3,135,537 | 6/1964 | Scott | 285/383 X |
| 2,601,654 | 6/1952 | Wright | 137/515 |
| 3,331,385 | 7/1967 | Taylor | 137/515 X |
| 2,320,339 | 6/1943 | Buttner | 137/469 |
| 2,670,922 | 3/1954 | Carlisle et al. | 137/540 |
| 3,099,999 | 8/1963 | Vismara | 137/515.5 X |
| 2,667,892 | 2/1954 | Gentzel | 137/536 X |

*Primary Examiner*—M. Cary Nelson
*Assistant Examiner*—David J. Zobkiw
*Attorney*—Fred S. Valles and Richard A. Dannells, Jr.

[57] ABSTRACT

A poppet and valve assembly are designed to eliminate prior art problems of fouling with solid materials, large pressure drop, and cracking due to stress concentrations in the valve systems for checking flow of fluids in tubing.

The valve assembly comprises an elongated valve body, upstream and downstream tailpieces, means for urging these tailpieces in sealing engagement with the valve body and a poppet which is seatable within the bore of the upstream tailpiece.

The poppet comprises an elongated member having a rear end portion, a forward end portion including a tapered shoulder and a substantially continuous and smooth surface area, orifices disposed on the tapered shoulder, a passageway open to the rear of the body member, and conduits communicating between the orifices and the passageway.

5 Claims, 3 Drawing Figures

PATENTED JUN 20 1972
3,670,766
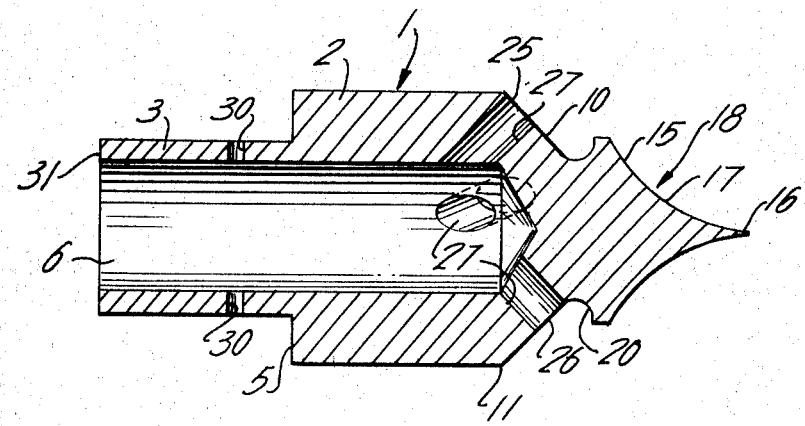
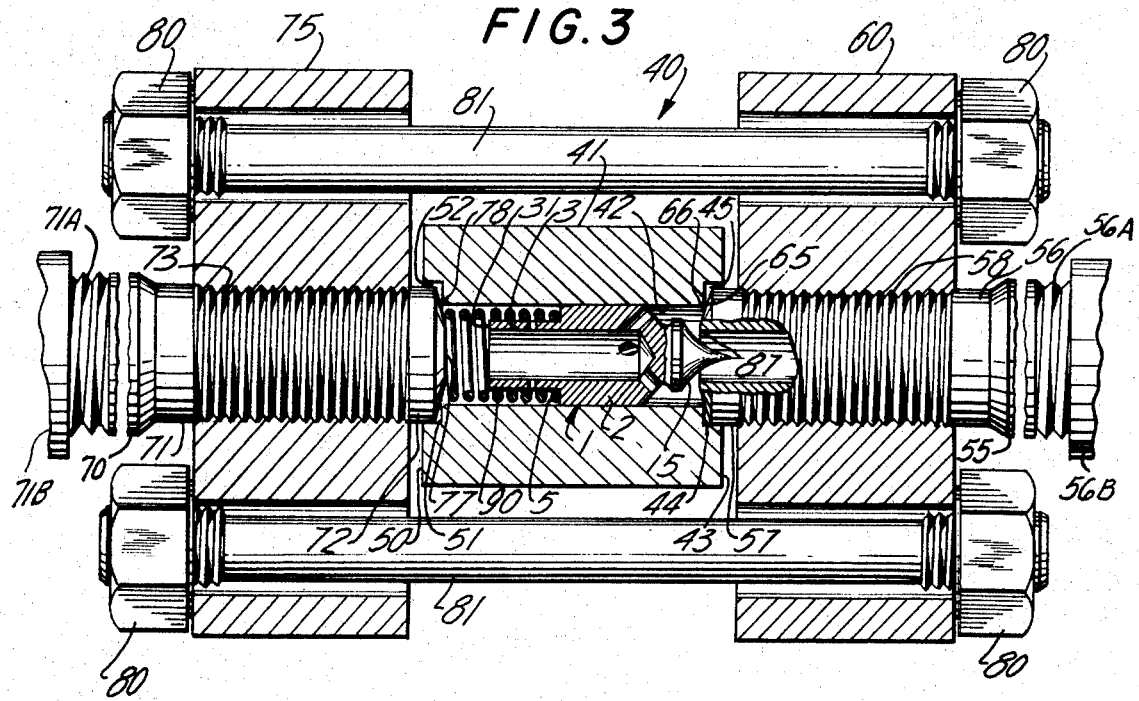
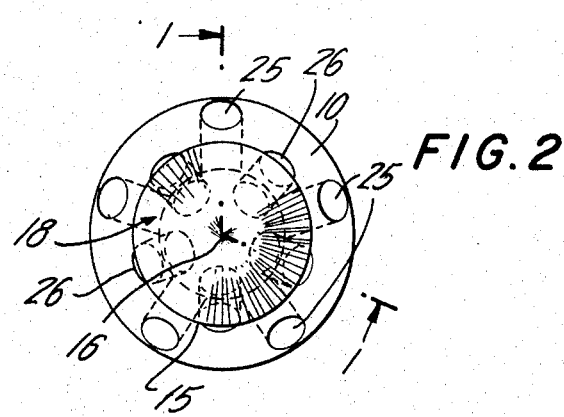
INVENTORS
HENRY K. TYSON
BY ALBERT Q. BUTLER
ATTORNEY

POPPET AND VALVE ASSEMBLY

BACKGROUND OF THE INVENTION

The present invention is directed to a poppet and a valve assembly and more particularly to an improved check valve assembly containing the poppet.

The prior art check valve assemblies have the tendency to foul around the closure element causing a great pressure drop and a restriction of the flow of fluids through the valve system which eventually leads to sticking of the closure element within the body of the valve assembly and to a backflow of the fluid within the valve. This tendency to foul is especially noted where the flow of fluids to be checked contains foreign materials such as solid particles and materials which react to form solids.

Another problem found in the prior art valve assemblies is the tendency to crack and in many cases to completely fail under stress concentrations inherent in the valve design.

One example of a prior art check valve assembly comprises a valve body having a longitudinal bore therethrough; upstream and downstream pipes or tailpieces threadably connected to each end of the valve body; a lens ring snugly mounted in the body against the upstream tailpiece with the bore of the lens ring in alignment with the longitudinal bore of the valve body; a ball to serve as the valve closure element; a movable, fluted guide for centering the ball; a spring for urging the fluted guide and ball against the lens ring; and a snugly fitting seat member for centering the downstream end of the spring. The prior art valve assemblies have the following disadvantages:

1. The tailpieces have a tendency to crack around the threaded root within the valve body.
2. The surface or sealing face of the lens ring has a tendency to gall under the influence of the upstream tailpiece as the tailpiece is threaded into place. The galling created by the metal-to-metal contact of the tailpiece against the lens ring forms metal shavings which interfere with the flow of fluids through the valve assembly.
3. The ball valve closure has a tendency to crack the lens ring because of the intermittent checking of the valve.
4. The ball and the valve seat become plugged with solids causing improper seating and even failure entirely of the ball to seat against the lens ring.
5. A large pressure drop exists because of the tortuous path and the constrictions through which the fluid must pass in the valve system and because of the buildup of solids noted in (4) above.
6. The spring also becomes plugged with solids because the fluid passes through the spring into the bore of the downstream tailpiece.
7. Sharp internal corners of the valve create stress concentrations. One example of such sharp corners includes the shoulder formed by the reduction of the diameter from the longitudinal bore of the valve body down to the longitudinal bore of the downstream tailpiece.
8. The fluted guide for centering the ball tends to score the longitudinal bore which also creates points of stress concentration. This is primarily the case where the fluted guide is centered within the bore by attachments that come into contact with the bore itself.
9. Increased maintenance and shutdown time is required to clean, repair, and replace the parts of the valve assembly because of all the problems noted hereinabove.

SUMMARY OF THE INVENTION

The present invention provides a unique solution to the foregoing problems of the prior art valves in which a novel poppet is provided to be incorporated within a novel valve assembly for checking the flow of fluids in tubing.

The poppet of this invention comprises a single valve closure element which can be substituted for the lens ring, the fluted guide, the ball, and the ball seat member of the prior art valve assemblies. The poppet of this invention eliminates the problems with respect to the ball and valve seat becoming plugged with solids, the large pressure drop across the valve system, the flow of fluids through the spring and the stress concentrations created by the fluted guide.

The valve assembly of this invention comprises an elongated valve body which is easy to dismantle from the entire valve system for easy maintenance and less down time than prior art valve assemblies. The present valve assembly does not contain internal threaded roots, a separate lens ring, tailpieces which must be threaded into the valve body, and internal corners of the prior art valve assemblies. In combination the poppet and valve assembly of this invention eliminate all of the above enumerated disadvantages of the prior art valve assemblies.

In accordance with the present invention, there is provided a poppet including an elongated body member having a forward end portion and a read end portion. The forward end portion includes a tapered shoulder extending forwardly and inwardly from the periphery of the body member and a substantially continuous and smooth surface area at the extremity of the tapered shoulder. At least one orifice is disposed on the tapered shoulder between the surface area and the periphery of the body member. A passageway opens to the rear of the body member and extends from the rear end portion toward the forward end portion. At least one conduit communicates between the orifice and the passageway.

Further, in accordance with this invention, there is provided a valve assembly comprising an elongated body having a longitudinal bore extending from an upstream to a downstream end, upstream and downstream tailpieces having their longitudinal bores in axial alignment with the bore of the valve body, means for urging the respective ends of the tailpieces in sealing engagement with the upstream and downstream ends of the valve body and a poppet housed within the bore of the valve body. At least a portion of the poppet is seatable within the bore of the upstream tailpiece for checking the flow of fluids through tubing.

BRIEF DESCRIPTION OF THE DRAWINGS

In the accompanying drawings:
FIG. 1 is a sectional view taken along the line 1—1 of FIG. 2 of the poppet embodying the preferred features of the present invention;
FIG. 2 is a front view of the poppet; and
FIG. 3 is a sectional view through the valve assembly according to the present invention.

PREFERRED EMBODIMENTS OF THIS INVENTION

In one of the preferred embodiments of this invention, there is provided a poppet of unitary construction including an elongated body member having a rear end portion, a forward end portion including a tapered shoulder having a substantially conical shape and extending forwardly and inwardly from the periphery of the body member and a substantially continuous and smooth surface area having a substantially conical shape at the extremity of the tapered shoulder. A plurality of orifices are disposed on the tapered shoulder between the surface area and the periphery of the body member. A substantially cylindrical passageway opens to the rear of the body member and extends from the rear end portion toward the forward end portion. The cross sectional area of the passageway and the summation of the cross sectional areas of the orifices each is at least 75 percent of the cross sectional area of the tubing through which the flow of fluids is passed. Cylindrical conduits are provided to communicate between each of the orifices and the passageway.

In another of the preferred embodiments of this invention, there is provided a valve comprising in combination:
a. an elongated valve body having a longitudinal bore extending from an upstream end to a downstream end of the valve body,
b. an upstream tailpiece having a first and a second end and a longitudinal bore therethrough in axial alignment with the bore of the valve body, the second end of the upstream tailpiece being connectable to the upstream portion of the tubing, c. a downstream tailpiece having a first and a second end and a longitudinal bore therethrough in axial alignment with the bore of the valve body, the second end of the downstream tailpiece being connectable to the downstream portion of the tubing, d. means operably connected to each of the upstream and downstream tailpieces for urging the first end of the upstream tailpiece in sealing engagement with the upstream end of the valve body and for urging the first end of the downstream tailpiece in sealing engagement with the downstream end of the valve body, and e. a poppet housed within the bore of the valve body at least a portion of which is seatable within the bore of the first end of the upstream tailpiece for checking the flow through the tubing.

Referring now to FIGS. 1 and 2, the poppet 1 is shown with all of its elements in unitary construction. Cylindrical body member 2 of poppet 1 has a cylindrical rear end portion 3 of smaller diameter than body member 2. Rear end portion 3 forms shoulder 5 with body member 2. Passageway 6 is formed by drilling along the longitudinal axis of body member 2 and rear end portion 3. Cylindrical shoulder 10 extends forwardly and inwardly from periphery 11 of body member 2. Conically shaped sealing face 15 and conical tip 16 are joined by means of fillet 17 to form the continuous and smooth surface area 18 at the extremity of conical shoulder 10. Surface area 18 is devoid of corners in which solid materials can lodge. In fact, the streamlined design of surface area 18 causes any solid particles entrained in the fluid to sweep at high velocity through the valve system. This produces a self-cleaning effect which is an important feature of this invention. Surface area 18 is joined to conical shoulder 10 by means of fillet 20. Five orifices 25 are equally spaced around shoulder 10 at periphery 11. In addition, five orifices 26 are equally spaced around conical shoulder 10 between orifices 25 and fillet 20. The center lines of orifices 25 and 26 are offset from one another as shown. Orifices 25 and 26 are the openings for cylindrical conduits 27 formed by drilling perpendicularly to the surface of conical shoulder 10 to passageway 6. Vent port 30 is formed by drilling through rear end portion 3 to passageway 6 between shoulder 5 and rear wall 31 to provide means to equalize the pressure between the interior and exterior of passageway 6. Unequal pressure could cause rear end portion 3 to become deformed because of the relative thinness of rear wall 31.

Poppet 1 is designed to check the flow of fluids through tubing without creating a detrimental pressure drop as the fluids pass from the upstream portion of the tubing, through valve assembly 40 illustrated in FIG. 3, through the downstream portion of the tubing to process equipment (not shown). Such a pressure drop would be detrimental to the process carried out in the process equipment downstream from the valve assembly 40 because of the reduced flow of fluids and the reduced pressure. The cross sectional area of passageway 6 and the summation of the cross sectional areas of orifices 25 and 26 are designed to be substantially equal to the cross sectional area of the tubing (not shown) through which the fluids to be checked are passed. If the cross sectional area of passageway 6 and the summation of the cross sectional areas of orifices 25 and 26 are at least 75 percent of the cross sectional area of the tubing, the pressure drop is small enough to prevent difficulties in the downstream process. Preferably, each of these cross sectional areas is between 85 and 115 percent of the cross sectional area of the tubing.

Check valve assembly 40 has elongated valve body 41 having a longitudinal bore 42 extending therethrough. Upstream end 43 of valve body 41 contains recess 44 which is formed by drilling a hole along longitudinal axis of valve body 41 concentric with longitudinal bore 42. Slot 45 is formed by milling a groove along the upper surface of recess 44 to provide means for venting the fluids in the event of a leak across the sealing face 15. Downstream end 50 of valve body 41 is provided with a similarly drilled recess 51 and slot 52. Upstream tailpiece 55 has a first end 56 and a second end 56A which is connectable to the upstream portion of the tubing (not shown) by connection means 56B. First end 56 has a guiding shoulder 57 and a threaded root 58 threadably engaged with upstream flange member 60. Sealing face 65 of end portion 56 is beveled at an angle of less than 90° from the axis of longitudinal bore 42 so that only circumferential contact is made with recess 44 as indicated at circumference 66. As shown in FIG. 3, this angle is approximately 60°. Similarly downstream tailpiece 70 is provided with first end 71 and second end 71A connectable to the downstream portion of the tubing (not shown) by connection means 71B. End portion 71 has a guiding shoulder 72 and a threaded root 73 threadably engaged with downstream flange member 75. Sealing face 77 is similarly beveled so that circumferential contact is made with recess 51 as shown at circumference 78. As flange nuts 80 are tightened on flange bolts 81, sealing faces 65 and 77 are brought into sealing contact with recesses 44 and 51 at circumferences 66 and 78, respectively. Poppet 1 is housed within valve body 41 with the external surface of cylindrical body member 2 in sliding contact with the surface of longitudinal bore 42. Poppet 1 is shown in its half-opened position. In its fully opened position, end wall 31 comes into contact with sealing face 77. In its fully closed position, sealing face 15 is in sealing contact with circumference 87. Spring 90 encircles rear end portion 3. The upstream end of spring 90 abuts shoulder 5 and the downstream end of spring 90 abuts sealing face 77.

Spring 90 is only absolutely essential in valve assembly 40 when low pressures exist on the downstream side of the valve. It is obvious that when sufficient downstream pressure is exerted to urge poppet 1 into a checking position, i.e. to urge sealing face 15 into contact with circumference 87, then spring 90 is not absolutely essential. However, even in high pressure service, spring 90 is preferred so that even a slight positive pressure on the downstream side of the assembly causes poppet 1 to go into a checking position.

Experimental use of valve assembly 40 has demonstrated that this assembly can be used in high pressure service for checking the flow of fluids containing entrained polymeric materials for over four continuous months without plugging or developing cracks or any of the other detrimental tendencies noted in the prior art valve assemblies. Experience obtained with valve assembly 40 has shown that about the only way that this assembly becomes plugged is if an upset occurs in the downstream processing equipment sending a large slug of solids through the downstream tubing to valve assembly 40. When this upset occurs it has been found that because of the unique design of valve assembly 40 including poppet 1, the assembly can be dismantled, washed free of solids, reassembled and the entire system brought back onstream in a much shorter time than is possible using prior art valve assemblies. The latter experience is just the opposite to the experience obtained with the prior art valve assemblies under the same conditions. Frequent shutdowns are necessary with these prior art assemblies at intervals of less than four months to either unplug the valve assembly or to repair and/or replace parts.

While only certain embodiments of the present invention have been described and illustrated herein, it is apparent to one having ordinary skill in the art that certain variations and modifications may be made to this invention without departing from its spirit and scope as disclosed herein and as defined in the appended claims.

What is claimed is:

1. In a valve for checking the flow of fluids through tubing in combination:

a. an elongated valve body having a longitudinal bore extending from an upstream end to a downstream end of said valve body, said upstream end and said downstream end of said valve body each having concentrically formed recesses contained therein, each of said recesses having a sealing surface provided therein, b. an upstream tailpiece having a first and a second end and a longitudinal bore therethrough in axial alignment with said bore of said valve body, said first end of said upstream tailpiece is beveled at an angle of less than 90° from the axis of said upstream tailpiece, said second end of said upstream tailpiece being connectable to the upstream portion of the tubing, c. a downstream tailpiece having a first and a second end and a longitudinal bore therethrough in axial alignment with said bore of said valve body, said first end of said downstream tailpiece is beveled at an angle of less than 90° from the axis of said downstream tailpiece, said second end of said downstream tailpiece being connectable to the downstream portion of the tubing, d. means operably connected to each of said upstream and downstream tailpieces for urging said first end of said upstream tailpiece in sealing engagement with said sealing surface of said recess in said upstream end of said valve body and for urging said first end of said downstream tailpiece in sealing engagement with said sealing surface of said recess in said downstream end of said valve body, and e. a poppet housed within said bore of said valve body at least a portion of which is seatable within the bore of said first end of said upstream tailpiece for checking the flow through the tubing.

2. The valve of claim 1 wherein a spring means is mounted between said first end of said downstream tailpiece and said poppet.

3. In a valve for checking the flow of fluids through tubing in combination:

a. an elongated valve body having a longitudinal bore extending from an upstream end to a downstream end of said valve body, said upstream end and said downstream end of said valve body each having concentrically formed recesses contained therein, each of said recesses having a sealing surface provided therein, b. an upstream tailpiece having a first and a second end and a longitudinal bore therethrough in axial alignment with said bore of said valve body, said first end of said upstream tailpiece is beveled at an angle of less than 90° from the axis of said upstream tailpiece, said second end of said upstream tailpiece being connectable to the upstream portion of the tubing, c. a downstream tailpiece having a first and a second end and a longitudinal bore therethrough in axial alignment with said bore of said valve body, said first end of said downstream tailpiece is beveled at an angle of less than 90° from the axis of said downstream tailpiece, said second end of said downstream tailpiece being connectable to the downstream portion of the tubing, d. means operably connected to each of said upstream and downstream tailpieces for urging said first end of said upstream tailpiece in sealing engagement with said sealing surface of said recess in said upstream end of said valve body and for urging said first end of said downstream tailpiece in sealing engagement with said sealing surface of said recess in said downstream end of said valve body, and e. a poppet including an elongated body member having:
 I. a rear end portion,
 II. a forward end portion including:
  A. a tapered shoulder extending forwardly and inwardly from the periphery of the said body member, and
  B. a substantially continuous and smooth surface area at the extremity of said tapered shoulder, said surface area being seatable within the bore in said first end of said upstream tailpiece for checking the flow through the tubing,
 III. at least one orifice disposed on said tapered shoulder between said surface area and said periphery,
 IV. a passageway open to the rear of said body member, extending from said rear end portion toward said forward end portion and in fluid communication with the bore in said downstream tailpiece, and
 V. at least one conduit communicating between said orifice and said passageway.

4. The valve of claim 3 wherein a spring means is mounted between said first end of said downstream tailpiece and said poppet.

5. The valve of claim 4 wherein said elongated body member is of substantially cylindrical shape, and wherein said rear end portion is of substantially cylindrical shape and has a diameter smaller than the diameter of said body member and wherein at least a portion of said spring means encircles said rear end portion abutting the shoulder formed between said rear end portion and said body member.

* * * * *